United States Patent [19]

Friesem et al.

[11] Patent Number: 4,998,786

[45] Date of Patent: Mar. 12, 1991

[54] METHOD OF PRODUCING HOLOGRAMS PARTICULARLY FOR HOLOGRAPHIC HELMET DISPLAYS

[75] Inventors: Asher A. Friesem; Yaakov Amitai, both of Rehovot, Israel

[73] Assignees: Yeda Research and Development Co. Ltd.; The Weizman Institute of Science, both of Rehovot, Israel

[21] Appl. No.: 270,868

[22] Filed: Nov. 14, 1988

[30] Foreign Application Priority Data

Jan. 15, 1988 [IL]  Israel ........................................ 85108

[51] Int. Cl.$^5$ ..................... G02B 5/32; G03H 1/28; G03H 1/22
[52] U.S. Cl. .................... 350/3.7; 350/3.75; 350/3.85
[58] Field of Search .................... 356/347, 376; 358/2; 350/3.6–3.86

[56] References Cited

U.S. PATENT DOCUMENTS

| | | | |
|---|---|---|---|
| 4,378,142 | 3/1983 | Ono | 350/3.6 |
| 4,575,192 | 3/1986 | Duthie et al. | 350/3.69 |
| 4,790,612 | 12/1988 | Dickson | 350/3.69 |
| 4,824,193 | 4/1989 | Maeda et al. | 350/3.72 |

*Primary Examiner*—Bruce Y. Arnold
*Assistant Examiner*—Thong Nguyen
*Attorney, Agent, or Firm*—Benjamin J. Barish

[57] ABSTRACT

A method of producing a desired hologram for a holographic optical element for use in imaging a multi-dimensional array of points, in which two coherent recording beams are utilized to produce an interference pattern which is recorded to form the desired hologram, characterized in that one or both of the recording beams have an aspherical wavefront derived from one or more intermediate holograms each reconstructed by the use of a read out beam having a geometry and/or wavelength different from the beams for recording the respective intermediate hologram.

3 Claims, 7 Drawing Sheets

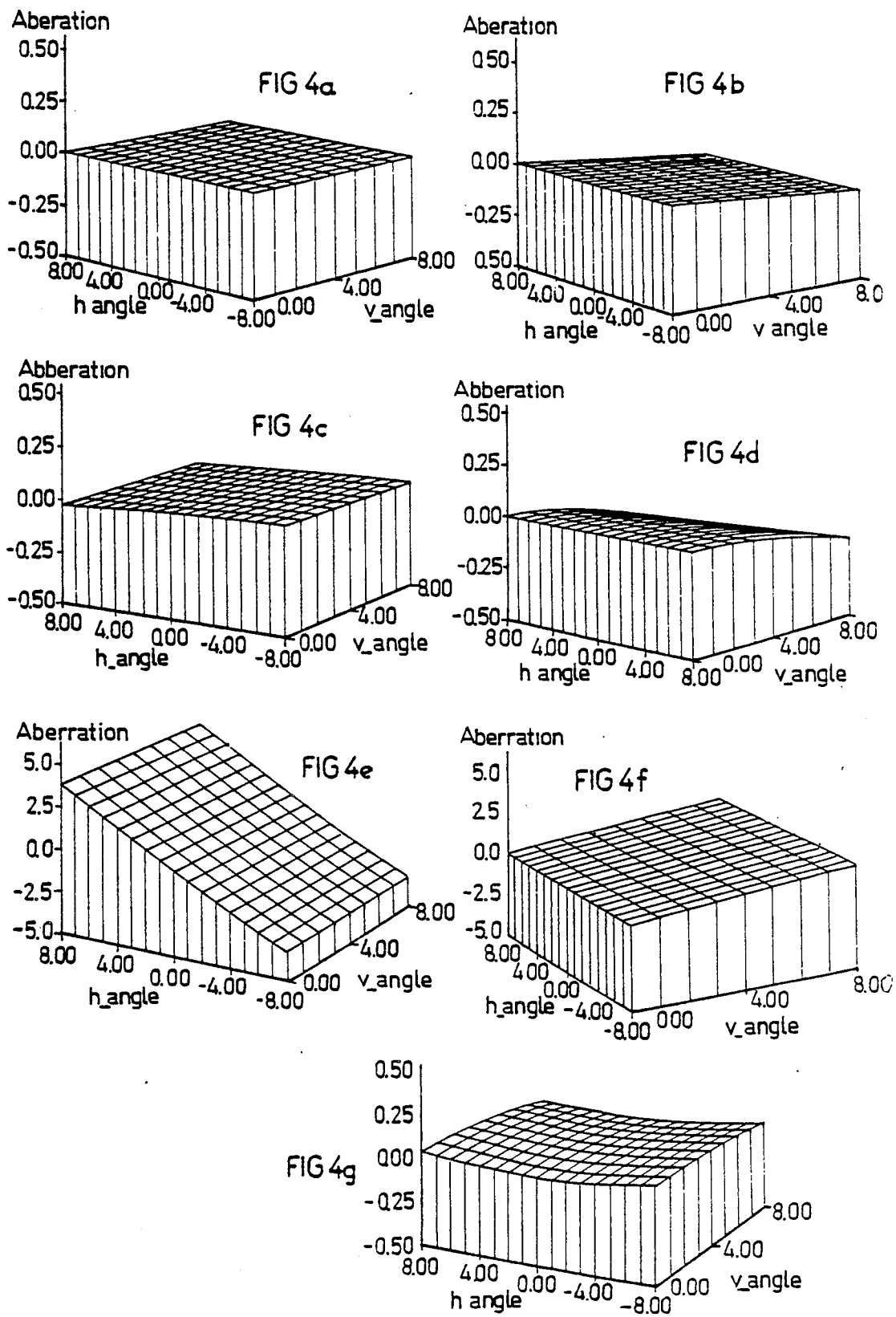

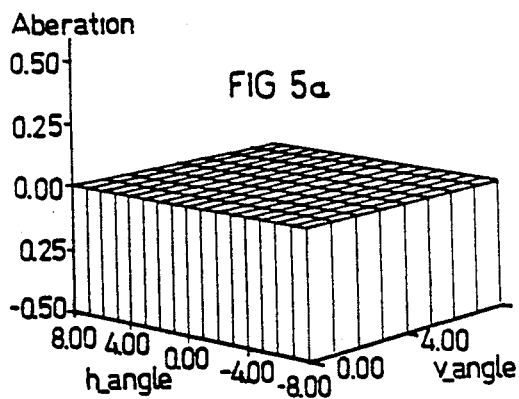
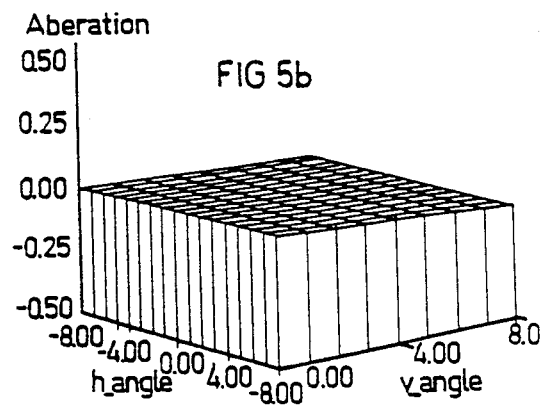
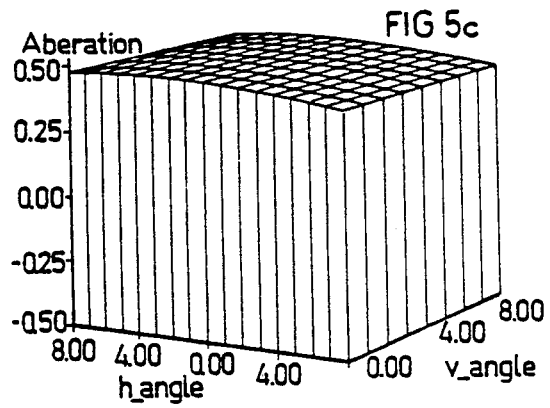
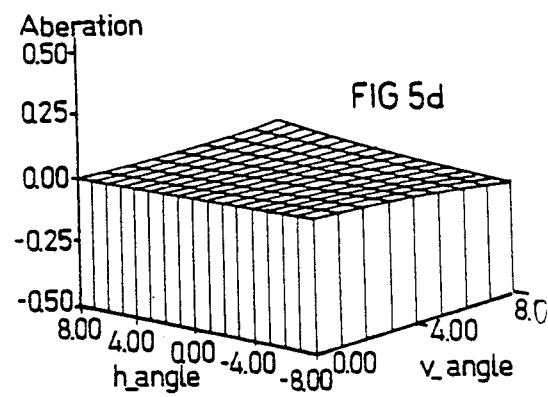
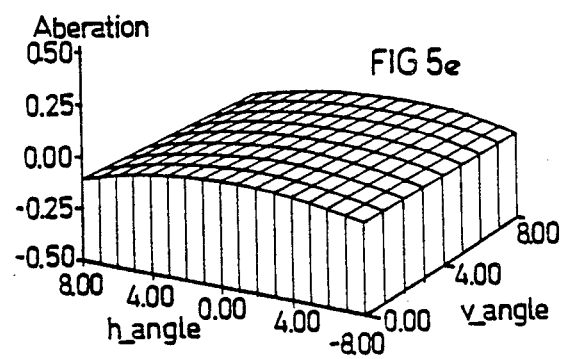
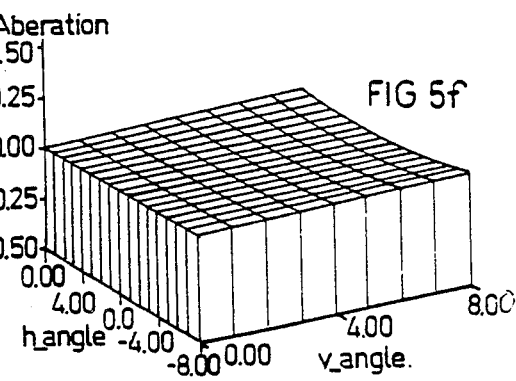
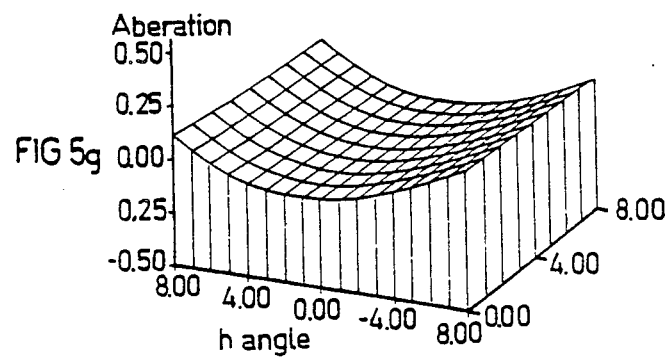

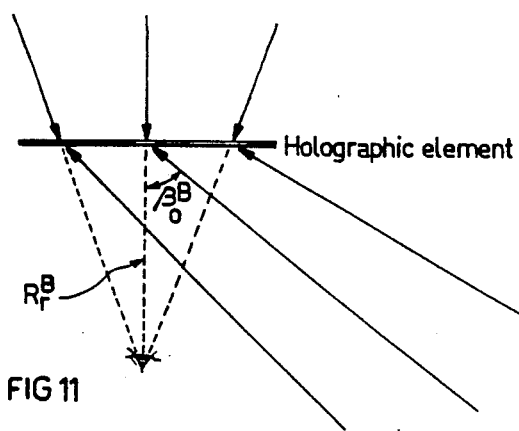
FIG 11
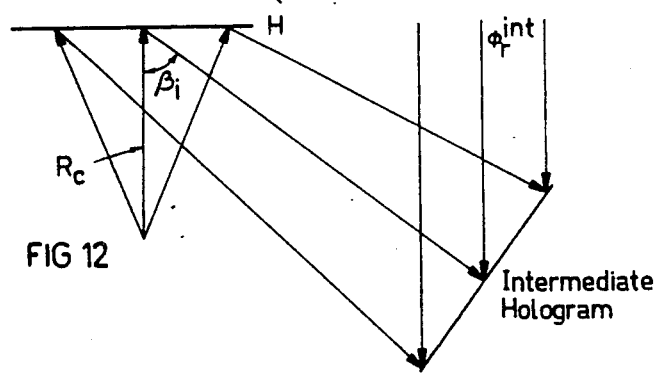
FIG 12
FIG 13
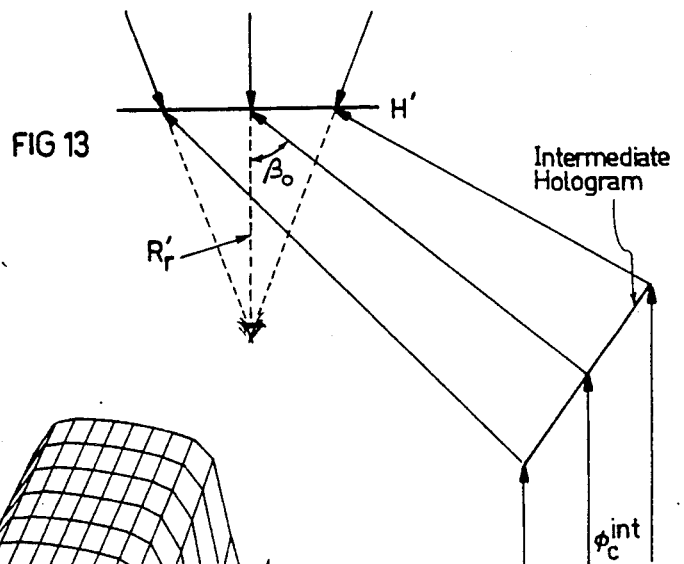
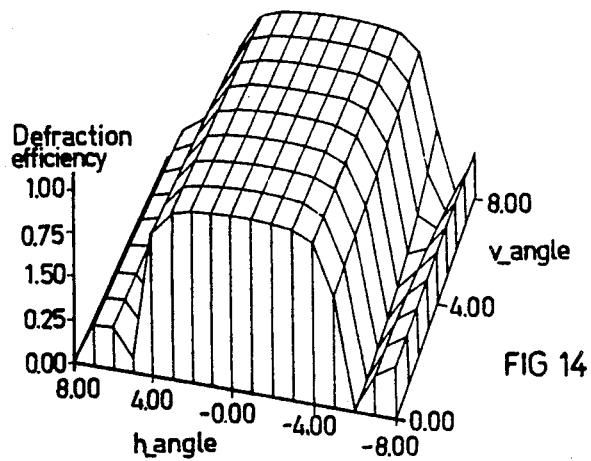
FIG 14

METHOD OF PRODUCING HOLOGRAMS PARTICULARLY FOR HOLOGRAPHIC HELMET DISPLAYS

BACKGROUND OF THE INVENTION

The present invention relates to a method for producing holograms. The invention is particularly useful for producing holographic optical elements (HOEs) for helmet displays, and is therefore described below with respect to this application.

Holographic optical elements (HOEs) have several advantages compared to conventional elements. They are lighter, more compact, and can be formed and replicated with relative ease. Even more important is the fact that they can sometimes perform complex optical operations which cannot be achieved with conventional elements. In general, the HOEs must be used with a monochromatic light source.

An important application for such HOEs is to serve as an imaging lens and combiner for a helmet mounted display. Here, a two dimensional monochromatic display is imaged to infinity and is reflected to a pilot's eye. The display can be direct from a CRT, or indirect through a relay lens or an optical fiber bundle. The display is comprised of an array of points whose geometrical conditions at read out will differ from those at recording. Consequently, these points will contain aberrations that decrease the quality of the image. In order to minimize these aberrations, it is necessary to include corrective elements, e.g., relay lenses, which are particularly disadvantageous in helmet displays because of the substantial increase in weight caused by the addition of such corrective elements.

Recently there have been several proposals for designing imaging holographic lenses with improved performance. In these designs, aspherical, rather than simple spherical waves, are used for recording the HOEs. The aspherical waves were derived from conventional optics, or from computer-generated-holograms (CGH). Unfortunately, such approaches for obtaining the aspherical waves must rely on fairly complicated and costly components and equipment. Moreover, the aberrations are not completely corrected during recording, so that some corrective elements are necessary for read out; as a result the overall helmet display unit becomes more complex, cumbersome, and heavy.

An object of the present invention is to provide a new method for producing desired holograms having improved performance and particularly useful for making holographic optical elements for helmet displays.

BRIEF SUMMARY OF THE INVENTION

According to the present invention, there is provided a method of producing a final hologram for a holographic optical element for use in imaging a multi-dimensional array of points, in which two coherent recording beams are utilized to produce an interference pattern which is recorded to form the final hologram over an entire field of view using reconstruction, object and reference waves according to predetermined recording and readout geometries and parameters, characterized in that at least two intermediate holograms are first produced and used for producing the final hologram; at least one intermediate hologram being produced by selecting the recording and readout parameters to reduce not only astigmatism, but also coma, spherical and field curvature aberrations which arise in holographic elements used for imaging a two-dimensional array of points because of the differences between the recording and readout geometries; and one other intermediate hologram is produced satisfying the Bragg condition over the entire final hologram in order to achieve high diffraction efficiency over the entire field of view of the final hologram.

One or both of the recording beams utilized to produce the interference pattern which is recorded to form the desired hologram, may have aspherical wavefronts derived from one intermediate hologram, or from a plurality of intermediate holograms recorded sequentially. In the latter case, the first intermediate hologram is prepared by recording the interference pattern between two recording beams each of a simple wavefront having a predetermined geometry and/or wavelength and read out with a read out beam of a simple wavefront having a geometry and/or wavelength different from both said recording beams to produce an output beam having a wavefront of a predetermined asphericity; each subsequent intermediate hologram being prepared by using, as one of its recording beams, the output beam of the immediately preceding intermediate hologram to produce an output beam of different asphericity.

It will thus be seen that in this approach, the desired hologram is recorded with a nonspherical wave derived from other holograms. These other holograms can either be recorded with spherical waves or nonspherical ones which ones also derive from earlier holograms and so on. Such a recording system can be viewed as a "family tree" of holograms, whose roots or "ancestors" are intermediate holograms which "nourish" the main trunk—the final desired hologram. Each hologram in the tree, including the final one, has three ancestors—the object, reference and reconstruction waves. Each ancestor can be either a spherical wave (here it is an independent root), or an output wave from another hologram which in turn has its own three ancestors.

The simplest possible example for such a holographic family tree is when the final hologram lens has three spherical waves as ancestors. In more complicated cases there is more than one hologram in the "tree", and the number of the recording parameters is more than seven. Since the number of invariants in the final hologram remains the same, more degrees of freedom are provided in this recording system than in the case of a spherical hologram. Consequently, better performance can be achieved.

As will be described more particularly below, in the preferred embodiment of the invention described below the predetermined parameters of the recording and readout geometries of the intermediate holograms for reducing the aberrations are selected according to the following equations:

$$\left\{ \begin{array}{l} \sin \beta_c^r + \mu^r [\sin \beta_o^r - \sin \beta_r^r] = -\sin \beta_{eye} \\ \dfrac{1}{R_c^r} + \mu^r \left[ \dfrac{1}{R_o^r} - \dfrac{1}{R_r^r} \right] = 0 \\ \dfrac{1}{(R_c^r)^3} + \mu^r \left[ \dfrac{1}{(R_o^r)^3} - \dfrac{1}{(R_r^r)^3} \right] = \dfrac{1}{R_o R_{eye}} \left[ \dfrac{1}{R_{eye}} - \dfrac{1}{R_o} \right] \\ \dfrac{\sin^2 \beta_c^r}{R_c^r} + \mu^r \left[ \dfrac{\sin^2 \beta_o^r}{R_o^r} - \dfrac{\sin^2 \beta_r^r}{R_r^r} \right] = 0 \end{array} \right.$$

-continued $$\left\{\begin{array}{l}\left|\dfrac{\sin\beta_c{}^r}{(R_c{}^r)^2}+\mu^r\left[\dfrac{\sin\beta_o{}^r}{(R_o{}^r)^2}-\dfrac{\sin\beta_r{}^r}{(R_r{}^r)^2}\right]\right|=\dfrac{\sin\beta_o}{R_oR_{eye}}\\ \left|\dfrac{\sin^3\beta_c{}^r}{(R_c{}^r)^2}+\mu^r\left[\dfrac{\sin^3\beta_o{}^r}{(R_o{}^r)^2}-\dfrac{\sin^3\beta_r{}^r}{(R_r{}^r)^2}\right]\right|=\dfrac{\sin^3\beta_o}{3R_oR_{eye}}\end{array}\right\}$$

where: "c", "o" and "r" are the indices of the reconstruction, object and reference waves, respectively; "$R_q$ (q=c,o,r)" is the distance between the respective point source and the center of the hologram; "$\beta_q$ (q=c,o,r)" is the angle between the projection of $R_q$ on the horizontal plane and the axis of the hologram; "$\mu$" is the ratio between the wavelengths of the readout and the recording waves; the parameters denoted with superscript "r" are related to the intermediate hologram, and those with no superscript are related to the final hologram; "$R_{eye}$" is the distance from the center of the final hologram to the observer's eye where the final image appears; and "$\beta_{eye}$" is the angle between the axis of the hologram and the observer's eye.

As will also be more particularly described below, the intermediate hologram satisfying the Bragg condition is produced by using a planar reference wave recording beam having a predetermined phase, and an object wave recording beam that is derived from the diffracted negative first order of the optimized intermediate hologram having reduced aberrations.

As will be described more particularly below, the above technique may be used for making holographic optical elements which obviate the need for including corrective lenses or other accessory components in order to produce a high quality image. Thus, the larger the number of intermediate holograms used in producing the holographic display, the better the quality of the image produced. The method of the present invention has been used for producing lightweight holographic helmet displays having a wide field of view (greater than 20°), high diffraction efficiency (greater than 80%), and high resolution capability (less than 1 mrad), without resorting to accessory components such as interim lenses.

Further features and advantages of the invention will be apparent from the description below.

BRIEF DESCRIPTION OF THE DRAWINGS

The invention is herein described, by way of example only, with reference to the accompanying drawings, wherein:

FIGS. 4a–4g illustrate the aberrations of the non-corrected element;

FIGS. 5a–5g illustrate the aberrations of the corrected element;

FIG. 11 illustrates the geometry for recording the holographic element so as to satisfy Bragg relation;

FIG. 12 illustrates the geometry for transferring the optimized grating function to the intermediate hologram;

FIG. 13 illustrates the geometry in the recording of the final holographic element H';

FIG. 14 illustrates the calculated diffraction efficiency for hologram H;

ABERRATION ANALYSIS

Figure 1:
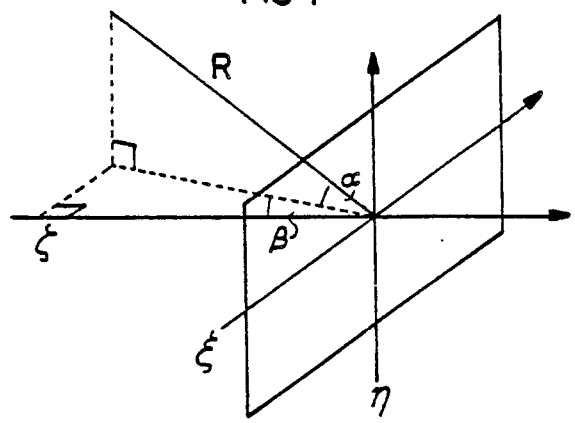
FIG. 1 illustrates the geometry for a spherical wave.

The diffraction from a hologram can be readily described by the phase of the participating recording and readout wavefronts. Specifically, the phase of the image wave, $\phi_i$, will, in general, be $$\phi_i = \phi_c \pm (\phi_o - \phi_r), \tag{1}$$

where i,c,o, and r are the indices of the image, reconstruction, object, and reference waves, respectively, and the $\pm$ sign refers to the diffracted positive first order (+) or the diffracted negative first order (−) of the hologram. When the desired Gaussian phase $\phi_d$ differs from the actual image phase $\phi_i$, we encounter some aberrations. For the geometries where the reference, object, and reconstruction waves are simple spherical waves, it is possible to describe the aberrations with a power series. Following the notation of Latta[1] (according to the calculations for off-axis hologram third-order aberrations by Champagne[2]), the Gaussian image properties of the hologram, because of wave matching in the meridional plane, are found as $$\sin\alpha_i = \sin\alpha_c \pm \mu[\sin\alpha_o - \sin\alpha_r], \tag{2}$$

$$\cos\alpha_i \sin\beta_i = \cos\alpha_c \sin\beta_c \pm \mu[\cos\alpha_o \sin\beta_o - \cos\alpha_r \sin\beta_r], \tag{3}$$

$$\frac{1}{R_i} = \frac{1}{R_c} \pm \mu\left(\frac{1}{R_o} - \frac{1}{R_r}\right). \tag{4}$$

where, as shown in FIG. 1, $R_q$ (q=c,o,r) is the distance between the respective point source and the center of the hologram, $\alpha_q$ is the angle between R and the $\xi$-$\zeta$ plane, $\beta_q$ is the angle between the projection of $R_q$ on the $\xi$-$\zeta$ plane and the $\zeta$ axis, $\mu$ is the ratio between the readout and the recording wavelengths (i.e. $\lambda_c/\lambda_o$), and the $\pm$ notation, as before, denotes the diffracted positive and negative orders.

[1] J. N. Latta, Appl. Opt. 10, 599 (1971)
[2] E. B. Champagne, J. Opt. Soc. Am. 57, 51 (1967)

The wavefront deviation from the Gaussian sphere may be written as $$\Delta = \Delta_F + \Delta_S + \Delta_C + \Delta_A, \tag{5}$$

where we define:

-continued the field curvature,
$$\Delta_F = \frac{2\pi}{\lambda_c} \tfrac{1}{2} F(\eta^2 + \xi^2), \quad (6)$$

the spherical aberration,
$$\Delta_S = \frac{2\pi}{\lambda_c} \tfrac{1}{8} S(\eta^2 + \xi^2)^2. \quad (7)$$

the coma,
$$\Delta_C = -\frac{2\pi}{\lambda_c} \tfrac{1}{2}[Cx(\xi^3 + \xi\eta^2) + Cy(\eta^3 + \eta\xi^2)], \quad (8)$$

and the astigmatism,
$$\Delta_A = \frac{2\pi}{\lambda_c} [\tfrac{1}{2} Ax\xi^2 + \tfrac{1}{2} Ay\eta^2 + Axy\eta\xi]. \quad (9)$$

The terms F, S, Cx, Cy, Ax, Ay and Axy are defined by the equations $$F = \frac{1}{R_c} - \frac{1}{R_I} \pm \mu\left[\frac{1}{R_o} - \frac{1}{R_r}\right], \quad (10)$$

$$S = \frac{1}{R_c^3} - \frac{1}{R_I^3} \pm \mu\left[\frac{1}{R_o^3} - \frac{1}{R_r^3}\right], \quad (11)$$

$$Cy = \frac{\sin \alpha_c}{R_c^2} - \frac{\sin \alpha_i}{R_I^2} \pm \mu\left[\frac{\sin \alpha_o}{R_o^2} - \frac{\sin \alpha_r}{R_r^2}\right], \quad (12)$$

$$Cx = \frac{\cos \alpha_c \sin \beta_c}{R_c^2} - \frac{\cos \alpha_i \sin \beta_i}{R_I^2} \pm \quad (13)$$
$$\mu\left[\frac{\cos \alpha_o \sin \beta_o}{R_o^2} - \frac{\cos \alpha_r \sin \beta_r}{R_r^2}\right].$$

$$Ay = \frac{\sin^2 \alpha_c}{R_c} - \frac{\sin^2 \alpha_i}{R_I} \pm \mu\left[\frac{\sin^2 \alpha_o}{R_o} - \frac{\sin^2 \alpha_r}{R_r}\right], \quad (14)$$

$$Ax = \frac{\cos^2 \alpha_c \sin^2 \beta_c}{R_c} - \frac{\cos^2 \alpha_i \sin^2 \beta_i}{R_I} \pm \quad (15)$$
$$\mu\left[\frac{\cos^2 \alpha_o \sin^2 \beta_o}{R_o} - \frac{\cos^2 \alpha_r \sin^2 \beta_r}{R_r}\right].$$

$$Axy = \frac{\cos \alpha_c \sin \alpha_c \sin \beta_c}{R_c} - \frac{\cos \alpha_i \sin \alpha_i \sin \beta_i}{R_I} \pm \quad (16)$$
$$\mu\left[\frac{\cos \alpha_o \sin \alpha_o \sin \beta_o}{R_o} - \frac{\cos \alpha_r \sin \alpha_r \sin \beta_r}{R_r}\right].$$

where $R_I$ is the distance between the hologram and the actual location of the image plane. When imaging only one point, it is best to choose that $R_i = R_I$, but such a choice is not suitable when imaging more than one point.

Figure 2A:
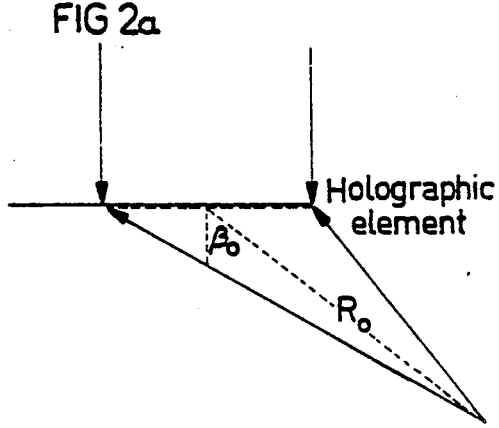
FIG. 2a illustrates the geometry for recording a simple holographic element for a helmet display.
Figure 2B:
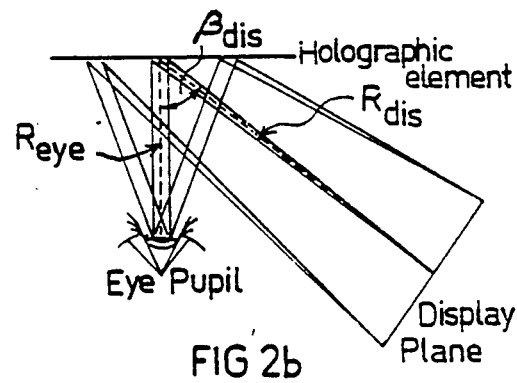
FIG. 2b illustrates the geometry for readout of a simple holographic element for a helmet display.

Now, the geometry for recording and readout of a simple reflective holographic element for a helmet display is shown in FIG. 2. For recording, FIG. 2(a), the object wave is an off-axis spherical wave at a distance $R_o$ and an angle $\beta_o$ from the center of the hologram, whereas the reference wave is a plane wave at an angle $\beta_r$ arriving from the opposite side to the hologram plane. For readout, FIG. 2(b), a display plane is inserted at an angle $\beta_{dis}$, which is the same as $\beta_o$, and at a distance $R_{dis}$ from the center of the hologram. An observer, located at a distance $R_{eye}$ and an angle $\beta_{eye}$ (which is opposite to $\beta_r$), sees a collimated image of the display. Even though the "real" reconstruction waves emerge from the display plane and are imaged by the hologram onto the eye, it is better (for the sake of simplifying the aberrations analysis) to invert the direction of the light rays. Thus, the reconstruction waves form an angular spectrum of plane waves (each having the diameter of the eye's pupil) that emerge from the eye and are focussed by the hologram onto the display's plane; the wave at the central viewing angle is focussed to the center of the display, whereas the foci of the waves with higher angles are laterally displaced.

If, as shown in FIG. 2b, the extent of the pupil is smaller than the hologram, then a single plane wave representing a particular viewing angle illuminates only part of the overall hologram. Thus, we may define, for each viewing angle, a local hologram whose aberrations can be determined separately. These aberrations will be a function of the geometrical parameters (assuming $\mu = 1$) of the overall hologram, and the distances x and y between the center of the local hologram and the center of the overall hologram on the axis $\xi$ and $\eta$ respectively. We denote $R_q$, $\beta_q$ and $\alpha_q$ as the parameters for the overall hologram, and $R_q(x,y), \beta(x,y)$ and $\alpha_q(x,y)$ for the local hologram. Since we are dealing with a very high F-number ($d_{eye} << R_o$) and high obliquity (sin $\beta_o > \tfrac{1}{2}$), then the dominant aberration is the astigmatism (i.e. Ax, Ay and Axy). In the following, we shall calculate these aberrations as a function of x,y.

Under the assumption of small angles, the parameters of the local holograms, along the $\xi$ axis, are $$\sin \beta_o(x,0) \simeq \sin\left(\beta_o - \frac{x}{R_o}\cos\beta_o\right) \simeq \beta_o - \frac{x}{R_o}\cos^2\beta_o, \quad (17)$$

$$\sin \beta_r(x,0) = \sin \beta_r \quad (18)$$

$$\sin \beta_c(x,0) \simeq \sin \beta_{eye} - \frac{x}{R_{eye}}, \quad (19)$$

$$R_o(x,0) \simeq R_o - x\sin\beta_o, \quad (20)$$

$$\frac{1}{R_I(x,0)} = \frac{1}{R_c(x,0)} = 0 \rightarrow \quad (21)$$

$$F(x,0) = -\frac{1}{R_I(x,o)} - \frac{1}{R_o(x,0)}$$

Substituting Eqs. (17) through (19) into Eq. (2) and using the relation $\sin \beta_r = -\sin \beta_{eye}$ and the fact that along the $\xi$ axis $\cos \alpha_q(x,0) = 1$ (q=o,r,c), we can find that $$\sin \beta_i(x,0) = \sin \beta_c(x,0) - \sin \beta_o(x,0) + \sin \beta_r(x,0) = \quad (22)$$
$$\sin \beta_{eye} - \frac{x}{R_{eye}} - \sin \beta_o + \frac{x}{R_o}\cos^2\beta_o +$$
$$\sin \beta_r = -\sin \beta_o + \frac{x}{R_o}\cos^2\beta_o - \frac{x}{R_{eye}}.$$

By exploiting Eqs. (17)-(22) we can calculate the astigmatism along the $\xi$ axis, using only the first nonvanishing order of x, $$Ax(x,0) = -\frac{\sin^2 \beta_i(x,0)}{R_I(x,0)} - \frac{\sin^2 \beta_o(x,0)}{R_o(x,0)} = \quad (23)$$

-continued $$\left[\frac{1}{R_o(x,0)} + F(x,0)\right]\sin^2\beta_i(x,0) - \frac{\sin^2\beta_o(x,0)}{R_o(x,0)} =$$

$$\frac{\sin^2\beta_i(x,0) - \sin^2\beta_o(x,0)}{R_o(x,0)} + F(x,0)\sin^2\beta_i(x,0) =$$

$$\frac{[\sin\beta_i(x,0) + \sin\beta_o(x,0)][\sin\beta_i(x,0) - \sin\beta_o(x,0)]}{R_o(x,0)} +$$

$$F(x,0)\sin^2\beta_i(x,0) \simeq$$

$$-\frac{x}{R_o(x,0)R_{eye}}\left[-2\sin\beta_o + \frac{2x}{R_o}\cos^2\beta_o - \frac{x}{R_{eye}}\right] +$$

$$F(x,0)\sin^2\beta_i(x,0) \simeq \frac{2\sin\beta_o}{R_o R_{eye}} x + F(x,0)\sin\beta_i^2(x,0).$$

The parameters of the local holograms, along the $\eta$ axis, are $$\sin\alpha_o(0,y) \simeq -\frac{y}{R_o}, \qquad (24)$$

$$\sin\alpha_r(0,y) = 0, \qquad (25)$$

$$\sin\alpha_c(0,y) \simeq -\frac{y}{R_o}, \qquad (26)$$

$$\sin\alpha_i(0,y) \simeq -y\left[\frac{1}{R_{eye}} - \frac{1}{R_o}\right], \qquad (27)$$

$$\sin\beta_o(0,y) = \sin\beta_i(0,y) = \sin\beta_o, \qquad (28)$$

$$-R_i(0,y) \simeq R_o(0,y) \simeq R_o, \qquad (29)$$

$$\frac{1}{R_r(0,y)} = \frac{1}{R_c(0,y)} = 0. \qquad (30)$$

By using Eqs. (24)–(30) we can calculate the astigmatism along the $\eta$ axis, using only the first nonvanishing order of y, $$A_y(0,y) = -\frac{\sin^2\alpha_i(0,y)}{R_i(0,y)} - \frac{\sin^2\alpha_o(0,y)}{R_o(0,y)} = \qquad (31)$$

$$\frac{1}{R_o}[\sin^2\alpha_i(0,y) - \sin^2\alpha_o(0,y)] =$$

$$\frac{1}{R_o}[\sin\alpha_i(0,y) + \sin\alpha_o(0,y)][\sin\alpha_i(0,y) - \sin\alpha_o(0,y)] =$$

$$\frac{1}{R_o}\left[\left(-\frac{y}{R_{eye}}\right)\left(\frac{2y}{R_o} - \frac{y}{R_{eye}}\right)\right] =$$

$$\frac{y^2}{R_o R_{eye}}\left[\frac{-2}{R_o} + \frac{1}{R_{eye}}\right].$$

$$A_{xy}(0,y) = -\frac{\sin\alpha_i(0,y)\sin\beta_i(0,y)}{R_i(0,y)} - \qquad (32)$$

$$\frac{\sin\alpha_o(0,y)\sin\beta_o(0,y)}{R_o(0,y)} \simeq \frac{\sin\beta_o}{R_o}[-\sin\alpha_i(0,y) - \sin\alpha_o(0,y)] =$$

$$\frac{\sin\beta_o}{R_o}\left[\frac{y}{R_{eye}}\right] = \frac{\sin\beta_o}{R_o R_{eye}} y.$$

DESIGN PROCEDURE

Our primary goal is to reduce the dominant astigmatic aberrations Ax, Ay and Axy, given by Eqs. (23), (31) and (32), respectively. This can be conveniently achieved by introducing controlled compensating aberrations into the reference wavefront; i.e. using a distorted wave rather than a perfect plane wave. In this section we shall determine how the introduction of controlled aberrations influences the astigmatism as well as the other aberrations.

In order to generate the necessary reference wave with the controlled aberrations, we exploit an interim hologram, using a readout geometry and wavelength which differ from those of recording. The resulting aberrated wavefront then serves as the reference wave for the final hologram. The phase of the reconstructed wavefront from the interim hologram is given by $$\phi_i^r = \phi_c^r \pm (\phi_o^r - \phi_r^r). \qquad (33)$$

where the superscript r denotes the parameters that are related to the interim hologram. Since $\phi_i^r$ becomes the phase of the reference wave for the final hologram (i.e. $\phi_i^r = \phi_r$), then substituting Eq. (33) into Eq. (1), yields $$\phi_i = \phi_c - \phi_o + [\phi_c^r \pm (\phi_o^r - \phi_r^r)]. \qquad (34)$$

This equation implies that the final aberrations for each local hologram, $Q^f(x,y)$, (Q=F, S, Cx, Cy, Ax, Ay, Axy), are comprised of two parts, as $$Q^f(x,y) = Q(x,y) + Q^r(x,y). \qquad (35)$$

where Q(x,y) denotes the various aberrations of the non-corrected element (as part of it was found in Eqs. (23), (31) and (32)) and $Q^r(x,y)$ denotes the aberrations of the interim hologram.

The goal of the design is for $Q^f(x,y)$ to be as small as possible. To achieve this goal, the various aberrations of the interim hologram must compensate, as closely as possible, for the aberrations of the non-corrected element, so, $$Q^r(x,y) \simeq -Q(x,y). \qquad (36)$$

It is desirable that this compensation be satisfied for each local hologram (or for each viewing angle), regardless of the distances x and y.

We now consider the aberrations of the interim hologram in more detail, in order to determine how they can be exploited for compensating the aberrations of the final hologram. We begin by assuming that for all the waves of the interim hologram $\alpha_q = 0$ (q=o,c,r). Similar to the derivation of Eqs. (17)–(21), the parameters of the local holograms along the $\xi$ axis are $$\sin\beta_q^r(x,0) = \qquad (37)$$

$$\sin\left(\beta_q^r - \frac{x}{R_q^r}\cos\beta_q^r\right) \simeq \sin\beta_q^r - \frac{x}{R_q^r}\cos^2\beta_q^r.$$

$$R_q^r(x,0) \simeq R_q^r - x\sin\beta_q^r, \qquad (38)$$

$$\frac{1}{R_q^r(x,0)} \simeq \frac{1}{R_q^r} + \frac{x}{(R_q^r)^2}\sin\beta_q^r. \qquad (39)$$

Using only the first nonvanishing order of x yields $$\frac{\sin^2 \beta_q{}^r(x,0)}{R_q{}^r(x,0)} \approx \frac{\sin^2 \beta_q{}^r - 2\frac{x}{R_q{}^r}\sin \beta_q{}^r \cos^2 \beta_q{}^r}{R_q{}^r - x\sin \beta_q{}^r} \approx \qquad (40)$$

$$\frac{\sin^2 \beta_q{}^r}{R_q{}^r} - \frac{2x}{(R_q{}^r)^2}\sin \beta_q{}^r \cos^2 \beta_q{}^r + \frac{x}{(R_q{}^r)^2}\sin^3 \beta_q{}^r =$$

$$\frac{\sin^2 \beta_q{}^r}{R_q{}^r} - \frac{2x}{(R_q{}^r)^2}\sin \beta_q{}^r + \frac{3x}{(R_q{}^r)^2}\sin^3 \beta_q{}^r.$$

Substituting Eqs. (39) and (40) into Eqs. (10), (13) and (15) yields $$Ax^r(x,0) = Ax^r - 2Cx^r x + 3Dx^r x, \qquad (41)$$

$$F^r(x,0) = F^r + Cx^r x, \qquad (42)$$

where $F^r$ can be readily arranged to zero, and where $Dx^r$ (which is one of the fifth-order aberrations of the interim hologram) is defined as $$Dx^r = \frac{\sin^3 \beta_c{}^r}{(R_c{}^r)^2} + \mu^r \left[ \frac{\sin^3 \beta_o{}^r}{(R_o{}^r)^2} - \frac{\sin^3 \beta_r{}^r}{(R_r{}^r)^2} \right]. \qquad (43)$$

The parameters of the local holograms along the $\eta$ axis are $$\cos \alpha_q{}^r(0,y) \approx 1, \qquad (44)$$
$$\sin \beta_q{}^r(0,y) \approx \sin \beta_q{}^r, \qquad (45)$$
$$\sin \alpha_q{}^r(0,y) \approx -\frac{y}{R_q{}^r}, \qquad (46)$$
$$R_q{}^r(0,y) \approx R_q{}^r. \qquad (47)$$

Using only the first non-vanishing order of y yields $$\frac{\sin^2 \alpha_q{}^r(0,y)}{R_q{}^r(0,y)} \approx \frac{y^2}{(R_q{}^r)^3}, \qquad (48)$$

$$\frac{\cos \alpha_q{}^r(0,y)\sin \alpha_q{}^r(0,y)\sin \beta_q{}^r(0,y)}{R_q{}^r(0,y)} \approx \frac{-y}{(R_q{}^r)^2}\sin \beta_q{}^r. \qquad (49)$$

Substituting Eqs. (48)-(49) into Eqs. (11), (12), (14) and (16) yields $$Ay^r(0,y) = S^r y^2, \qquad (50)$$

$$Axy^r(0,y) = -Cx^r y. \qquad (51)$$

Now, that we have derived the dominant astigmatic aberrations equations of $Ax^r$, $Ay^r$ and $Axy^r$, we can compare them to the astigmatic aberrations of the final element according to Eq. (36), and to determine what each term of the equations must be in order to achieve the desired compensation. We begin by juxtaposing Eq. (31) and (50) to obtain that $$S^r = \frac{1}{R_o R_{eye}} \left[ \frac{1}{R_{eye}} - \frac{2}{R_o} \right] \qquad (52)$$

We then juxtapose Eqs. (32) and (51) to obtain that $$Cx^r = \frac{\sin \beta_o}{R_o R_{eye}}. \qquad (53)$$

This result, namely that $Cx^r$ is not zero, unfortunately introduces a field curvature [Eq.(42)] that must be now compensated for. This will be done by introducing a field curvature into the final element, of the form $$F(x,0) = -Cx^r x = -\frac{\sin \beta_o}{R_o R_{eye}} x. \qquad (54)$$

By substituting Eq. (54) into Eq. (23) and comparing the resulting equation with Eq. (41) we find that $$Ax^r = 0, \qquad (55)$$

and $$Dx^r = \frac{\sin^3 \beta_o}{3 R_o R_{eye}}. \qquad (56)$$

There is also a constraint that the image wave of the interim hologram, which is the reference wave for the final hologram, must be a plane wave emerging at an angle conjugate to $\beta_{eye}$, namely $$\beta_t{}^r = 180° + \beta_{eye}, \qquad (57)$$

$$\frac{1}{R_t{}^r} = 0. \qquad (58)$$

In order to determine how the field curvature [Eq. (54)] can be introduce into the final hologram, we begin by noting that if the display plane is normal to the line between the center of the hologram and the center of the display, then for small viewing angles $$\frac{1}{R_f(x,0)} \approx \frac{1}{R_o(x,0)}. \qquad (59)$$

Figure 3:
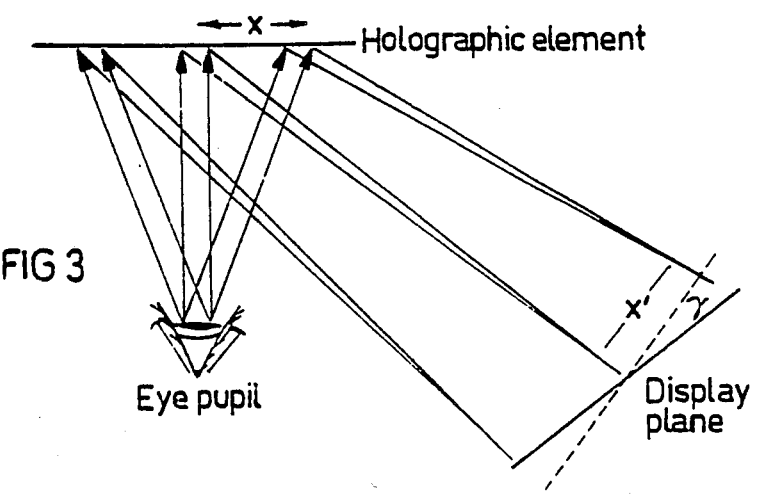
FIG. 3 illustrates the rotation of the display plane around its vertical axis by an angle.

Equation (59) indicates that the field curvature, $F(x,0)$, for this geometry, is zero. A field curvature can be introduced by rotating the display plane around its vertical axis with an angle $\gamma$, as shown in FIG. 3. We define $\gamma$ as positive when the rotation is clockwise. After rotation, $R_f(x,0)$ is modified to $$R_f(x,0) \approx -R_o(x,0) - x' \tan \gamma, \qquad (60)$$

where $x'$, the distance between the center of the image spot and the center of the display, is $$x' = \frac{xR_{dis}}{R_{eye}\cos \beta_{dis}} = \frac{xR_o}{R_{eye}\cos \beta_o}. \qquad (61)$$

Substituting Eqs. (60) and (61) into Eq. (21) yields $$F(x,0) = -\frac{1}{R_f(x,0)} - \frac{1}{R_o(x,0)} \approx \qquad (62)$$

$$\frac{1}{R_o(x,0) + x'\tan\gamma} - \frac{1}{R_o(x,0)} \approx \frac{x'\tan\gamma}{(R_o)^2} \approx -\frac{x\tan\gamma}{R_o R_{eye}\cos \beta_o}.$$

Finally, by juxtaposing Eqs. (62) and (57), yields $$\gamma = \arctan(\sin \beta_o \cos \beta_o). \qquad (63)$$

The relations that describe the relevant parameters of the interim hologram [Eqs. (52), (53) and (55)–(58)] can now be written explicitly as a set of six equations:

$$\begin{cases} \sin\beta_c{}^r + \mu^r[\sin\beta_o{}^r - \sin\beta_r{}^r] = -\sin\beta_{eye} \\ \dfrac{1}{R_c{}^r} + \mu^r\left[\dfrac{1}{R_o{}^r} - \dfrac{1}{R_r{}^r}\right] = 0 \\ \dfrac{1}{(R_c{}^r)^3} + \mu^r\left[\dfrac{1}{(R_o{}^r)^3} - \dfrac{1}{(R_r{}^r)^3}\right] = \dfrac{1}{R_o R_{eye}}\left[\dfrac{1}{R_{eye}} - \dfrac{1}{R_o}\right] \\ \dfrac{\sin^2\beta_c{}^r}{R_c{}^r} + \mu^r\left[\dfrac{\sin^2\beta_o{}^r}{R_o{}^r} - \dfrac{\sin^2\beta_r{}^r}{R_r{}^r}\right] = 0 \\ \dfrac{\sin\beta_c{}^r}{(R_c{}^r)^2} + \mu^r\left[\dfrac{\sin\beta_o{}^r}{(R_o{}^r)^2} - \dfrac{\sin\beta_r{}^r}{(R_r{}^r)^2}\right] = \dfrac{\sin\beta_o}{R_o R_{eye}} \\ \dfrac{\sin^3\beta_c{}^r}{(R_c{}^r)^2} + \mu^r\left[\dfrac{\sin^3\beta_o{}^r}{(R_o{}^r)^2} - \dfrac{\sin^3\beta_r{}^r}{(R_r{}^r)^2}\right] = \dfrac{\sin^3\beta_o}{3R_o R_{eye}} \end{cases} \quad (64)$$

We see that for these six equations there are seven variables—$R_q{}^r$ and $\beta_q{}^r$ (q=o,r,c) and $\mu^r$. In order to solve for these variables, we find it convenient to let $\mu^r$ be a free parameter. In our calculations we set $\mu^r$ to be that value which minimizes the higher orders of x and y for the aberrations Ax, Axy and F. It should be noted that here we have been limited to seven variables because we used only one interim hologram in the recording process. In general, it is possible to increase the number of variables by introducing recursively additional interim holograms in the reference waves, as well as in the object wave.

DESIGN ILLUSTRATION

The recursive design technique will now be applied for designing and recording a combiner and imaging lens for a helmet display (FIG. 2) having the following parameters: $R_{dis}=100$ mm, $\beta_{dis}=40°$, $R_{eye}=70$ mm, $\beta_{eye}=0°$. A circular aperture of $d_{eye}=4$ mm diameter was chosen for the eye's pupil. Accordingly, the recording parameters of the non-corrected element are: $R_o=100$ mm, $\beta_o=40°$, $R_r=\infty$ and $\beta_r=180°$. By substituting these values into Eq. (64) we solved for the parameters of the interim hologram, to obtain $$\begin{aligned} R_o{}^r &= -86.6 \text{ mm}, \beta_o{}^r = 12.8°, \\ R_r{}^r &= 194.7 \text{ mm}, \beta_r{}^r = 71.2°, \\ R_c{}^r &= 79 \text{ mm}, \beta_c{}^r = 34°, \\ \mu^r &= 0.77. \end{aligned} \quad (65)$$

We then recorded an interim hologram from which the aberrated reference wave for the final holographic element was derived. The rotation angle of the display plane, according to Eq. (63), is $$\gamma = 26°. \quad (66)$$

We calculated the aberrations as a function of the horizontal and vertical viewing angle, ranging to an overall FOV of ±8°, for a corrected element as well as a non-corrected element (that was recorded with unaberrated reference wave). These aberrations were converted to units of milliradians by exploiting the relation $$-\frac{\lambda_c}{2\pi} \cdot \frac{\partial}{\partial \xi}$$

for each aberration[1]. The calculated results of the various aberrations are shown in FIGS. 4 and 5; note that the aberration scale of Ax and Axy for the non-corrected element [FIG. 4 (e) and (f)] is greater by a factor of 10 than the scale for the other aberrations. As shown, the dominant aberration of the non-corrected element is the Ax (FIG. 4(e)) and Axy (FIG. 4(f)), whereas the contribution from the other aberrations is negligible. For the corrected element the astigmatism is significantly improved. Although Cx is now the dominant aberration (FIG. 5(c)), it is still much smaller than the astigmatism of the non-corrected element. Thus, the total amount of aberrations for the corrected element is significantly smaller than for the non-corrected element.

[1] J. L. Rayces, Opt. Acta, 11, 85 (1964)

Figure 6:
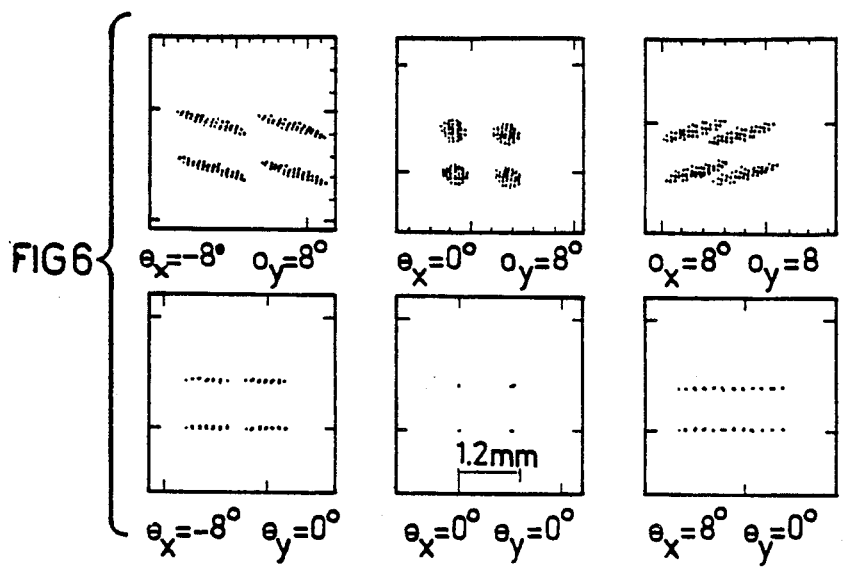
FIG. 6 is the spot diagram for the non-corrected element.
Figure 7:
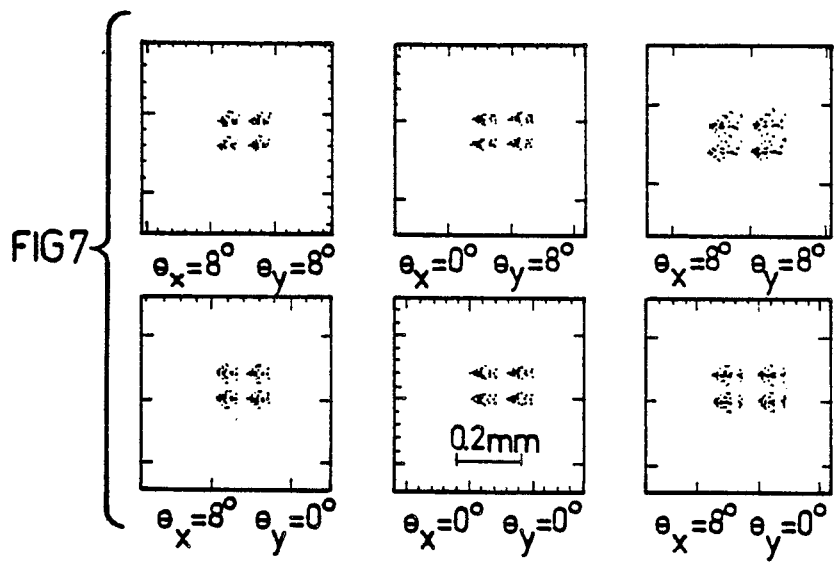
FIG. 7 is the spot diagram for the corrected element.

We also calculated the size and shape of the spots in the display plane that the eye sees through the hologram for each viewing angle. This was done by a ray tracing analysis, where the rays were traced from the pupil through the hologram onto the display plane. FIGS. 6 and 7 show the calculated spot diagrams covering a FOV up to ±8°. FIG. 6 shows the spot diagram for the non-corrected element. In each part of the figure, spots derived from four different viewing angles, with an angular separation of 8 milliradians, are drawn; $\theta_x$ and $\theta_y$ denote the area in the FOV in the horizontal and vertical direction, respectively. It can be deduced from these results that the resolution of the imaging element in the horizontal axis is worse than 8 miliradians at the edges of the FOV. FIG. 6 shows the spot diagram for the corrected lens; note the factor of 6 between the scales of FIG. 6 and FIG. 7. For the corrected lens, the angular separation between the viewing angles was 0.8 milliradians. As can be deduced from these results, the resolution of the corrected lens is now better than 0.8 milliradians over the whole FOV.

Figure 8:
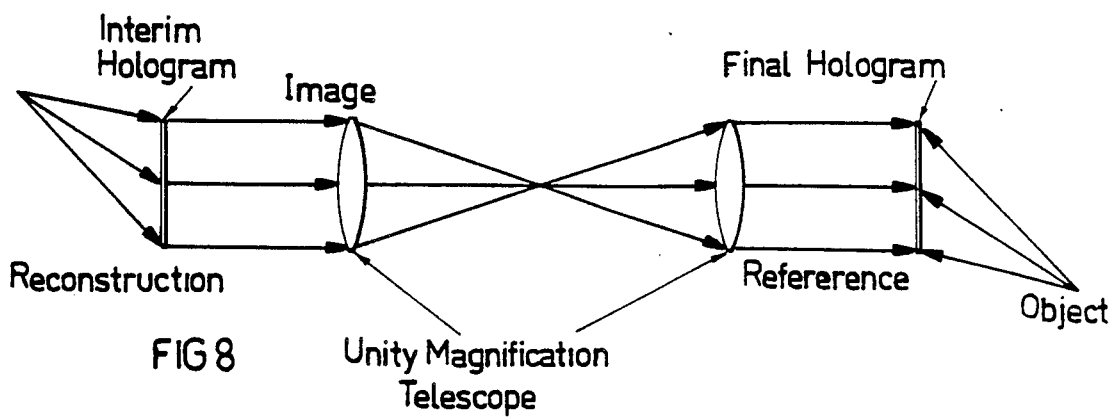
FIG. 8 illustrates the geometry for recording a corrected holographic element.
Figure 9:
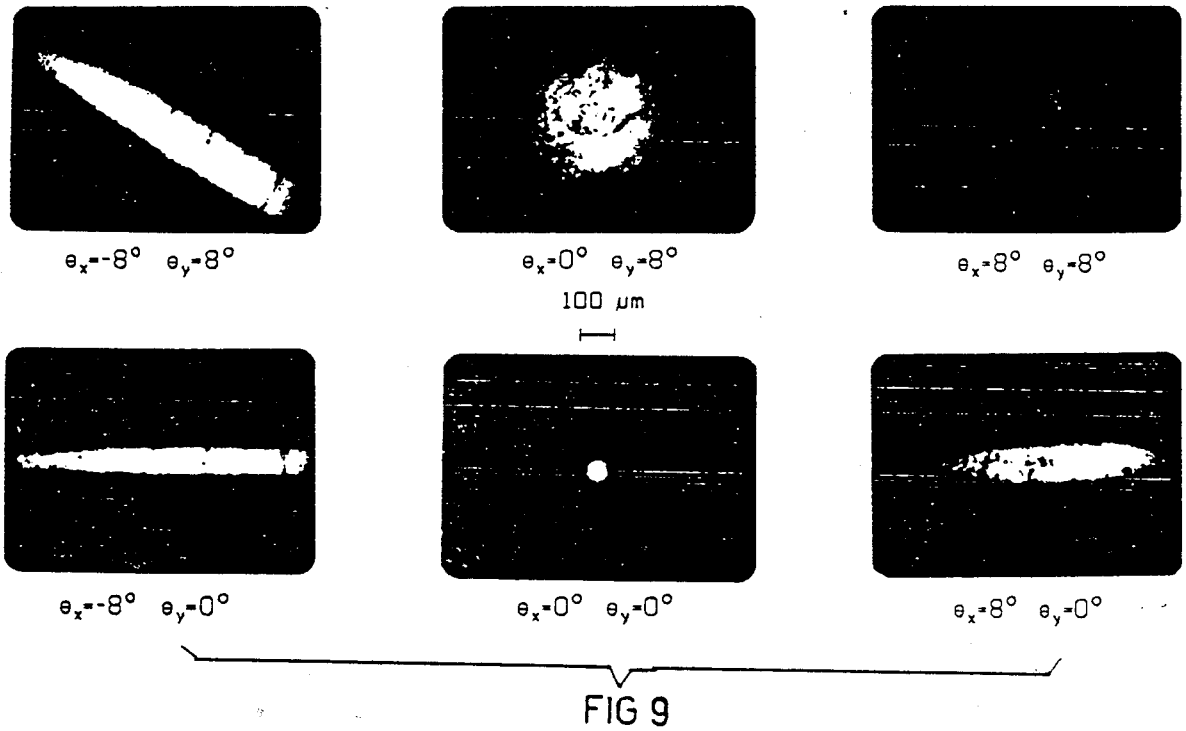
FIG. 9 illustrates an experimental spot distribution in the display plane of the non-corrected holographic element.
Figure 10:
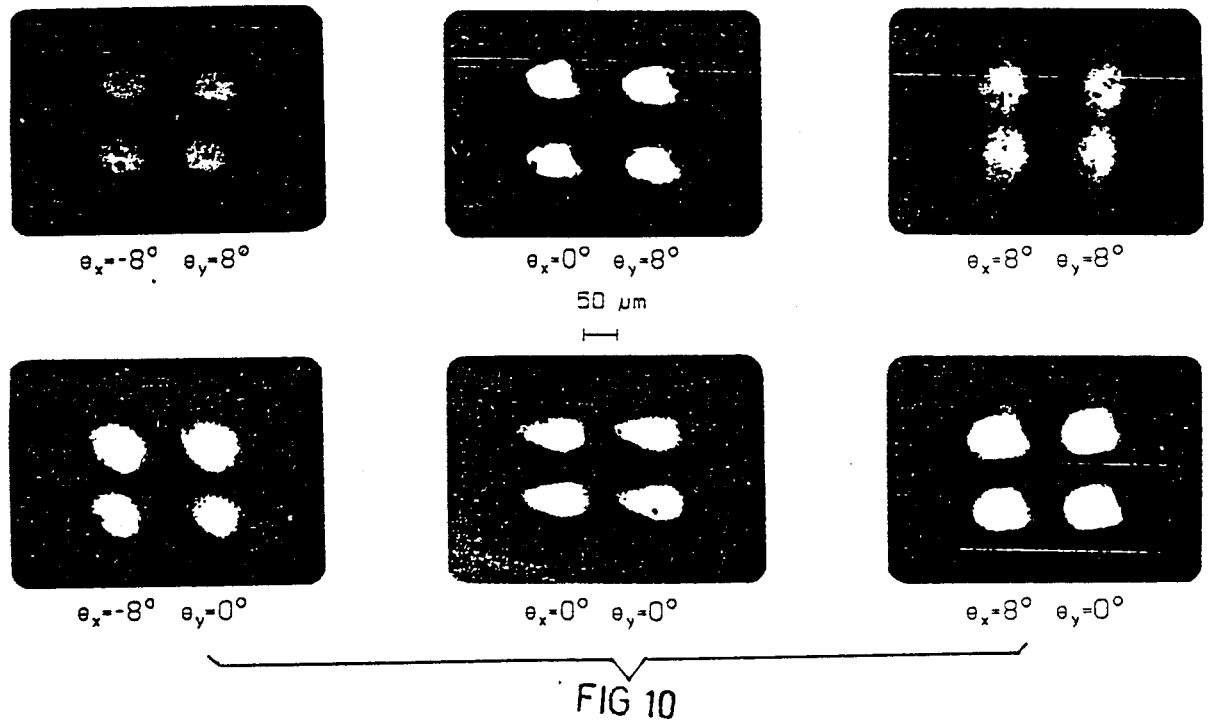
FIG. 10 illustrates the experimental spot distribution in the display plane of the corrected holographic element.

To verify our design and calculations, we recorded the necessary interim hologram and then the final holographic element. The reconstructed aberrated wavefront from the plane of the interim hologram was transferred by means of a telescope to the plane of the final holographic element, according to the arrangement shown in FIG. 8. For comparison, we also recorded a conventionally designed non-corrected element. These elements were then tested experimentally at six different areas of the FOV by introducing plane waves from a rotating mirror at the location of the pupil and checking the spots at the display plane. The spots at the display plane were photographed and the results are shown in FIGS. 9 and 10; note the factor of two between the scales in the Figures. FIG. 9 shows the experimental results for the noncorrected element, where only one plane wave was used for each area. As expected the central spot, at $\theta_x = \theta_y = 0$, is very small and we measured that it is a diffraction limited spot. However, the Sept sizes increase significantly at the edges of the FOV. FIG. 10 shows the experimental results for the corrected element. Here, four adjacent plane waves with angular separation of 0.8 milliradians were used for each area of the FOV. As shown all four spots can be resolved uniformly over the entire range of FOV, indicating that the resolution is at least 0.8 milliradians. The improvement in performance of the corrected element is evident.

CONSTRUCTING AN ELEMENT WITH HIGH DIFFRACTION EFFICIENCY

So far we dealt with the aberrations and image geometry that depend on the two dimensional grating function of the holographic element. As a result, the diffraction efficiency is low at the edges of the FOV where the Bragg relation is not satisfied. We shall now design the element so that, in addition to having low aberration, the diffraction efficiency, which depends on the three dimensional volume distribution of the grating[1], is high over the entire FOV. If we were solely interested in obtaining a high diffraction efficiency, we could have record the element with two spherical waves, one of which converges to (or diverges from) the center of the eye pupil[2], as shown in FIG. 11. In such a case the relevant geometry and parameters for our design would be $R_r{}^B = -70$ mm, and $\beta_r{}^B = 180°$. Then, in order to ensure that the imaging parameters will be the same as for the element that was designed earlier, $R_o{}^B = -233$ mm and $\beta_o{}^B = 40°$. The parameters having a superscript B belong to the optimal recording waves that fulfill the Bragg relation. It is evident, for the geometries shown in FIGS. 2(b) and 11, that the central ray at each viewing angle satisfies the Bragg relation. Consequently, since $d_{eye} < < R_{eye}$, the rays around each central ray will also satisfy the Bragg relation. Unfortunately, although such an element has high diffraction efficiency, it would contain relatively large aberrations even at the center of the FOV.

[1] H. Kogelnik, Bell Syst. Tech. J. 48, 2909 (1969).
[2] Q. J. Withrington, Computer Aided Optical Design, SPIE 147, 161-170 (1978).

In order to obtain an element having low aberrations as well as high diffraction efficiency, it is possible to incorporate the optimal holographic element that was designed to have low aberrations into a final element with the same grating function as well as with high diffraction efficiency. [3]We start with the optimal grating function of the corrected element, $$\Phi_H{}^{opt} = \phi_o - \phi_r = \phi_o - \phi_r', \qquad (67)$$

where $\phi_r'$, $\phi_o$ and $\phi_r$ are the same as before. The incorporation of optimization and high diffraction efficiency into the final element can be achieved with the aid of an intermediate hologram as shown in FIG. 12. The intermediate hologram is recorded with a planar reference wave, having the phase $\phi_r{}^{int}$ and an object wave that is derived from the diffracted negative first order of the optimized hologram H. If the optimized hologram is reconstructed with a wavefront having a phase $\phi_c = -\phi_r{}^B$, then the reconstructed wavefront, which serves as the object wavefront for the intermediate hologram, is $$\phi_i = -\phi_r{}^B - \Phi_H{}^{opt}. \qquad (68)$$

[3] Y. Amitai and A. A. Friesem, in press (Optics Letters).

The configuration for recording the the final element H' is shown in FIG. 13 (the prime denotes all the parameters which refer to the final hologram). The intermediate hologram is reconstructed with a conjugate plane wave (i.e. $\phi_c{}^{int} = -\phi_r{}^{int}$), so the phase of the reconstructed wavefront is precisely $-\phi_i$ at the plane of H' which is the original location of H; thus $\phi_o' = -\phi_i$. The reference wave for H' is the conjugate of the wave that was used for reconstructing H, thus $$\phi_r' = \phi_r{}^B. \qquad (69)$$

Substituting Eqs. (68) and (69) into Eq. (67), yields the grating function for H' as $$\begin{aligned}\Phi'_H &= \phi_o' - \phi_r' = -\phi_i - \phi_r' \\ &= \phi_r{}^B + \Phi_H{}^{opt} - \phi_r{}^B = \Phi_H{}^{opt}.\end{aligned} \qquad (70)$$

This grating function was, of course, recorded with reference and object wavefronts that are appropriate for an efficient hologram. Specifically, Eq. (69) implies that the parameters for the reference wave are $$R_r' = R_r{}^B, \qquad (71)$$

$$\beta_r' = \beta_r{}^B. \qquad (72)$$

Similarly, from Eq. (68), and using the fact that $$\frac{1}{R_o} - \frac{1}{R_r} = \frac{1}{R_o{}^B} - \frac{1}{R_r{}^B}$$

and that $\sin \beta_o - \sin \beta_r = \sin \beta_o{}^B - \sin \beta_r{}^B$, we find that $$\frac{1}{R_o'} = \frac{1}{R_r{}^B} + \frac{1}{R_o} - \frac{1}{R_r} = \frac{1}{R_r{}^B} + \frac{1}{R_o{}^B} - \qquad (73)$$

$$\frac{1}{R_r{}^B} = \frac{1}{R_o{}^B}.$$

$$\sin \beta_o' = \sin \beta_r{}^B + \sin \beta_o - \sin \beta_r = \sin \beta_r{}^B + \qquad (74)$$

$$\sin \beta_o{}^B - \sin \beta_r{}^B = \sin \beta_o{}^B.$$

Clearly then, the conditions of optimal grating function and high diffraction efficiency were incorporated into the final hologram H'.

Figure 15:
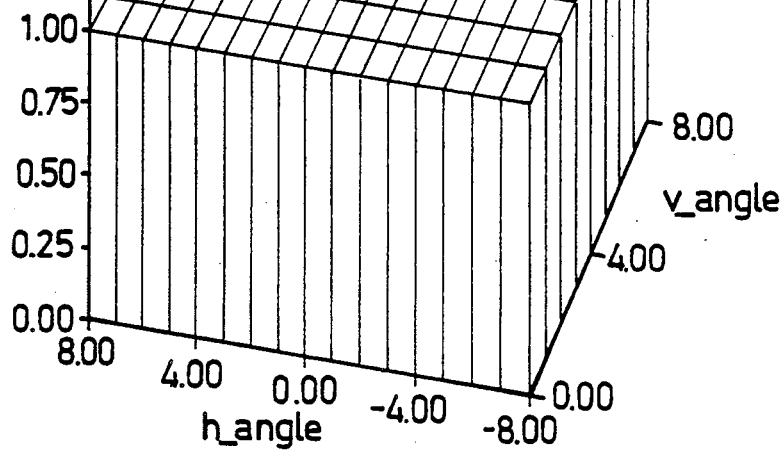
FIG. 15 illustrates the calculated diffraction efficiency for the final hologram H'.

FIGS. 14 and 15 shows the calculated diffraction efficiencies of the holograms H and H' as a function of the horizontal and vertical viewing angle, over a FOV of ±8°. For the calculation we assumed that the hologram thickness is 15 µm, the average refractive index is 1.5, and the refractive index modulation is 0.04. As shown, the diffraction efficiency for H decreases rapidly after 5°, whereas for H' it remains high over the entire FOV of ±8°.

Figure 16:
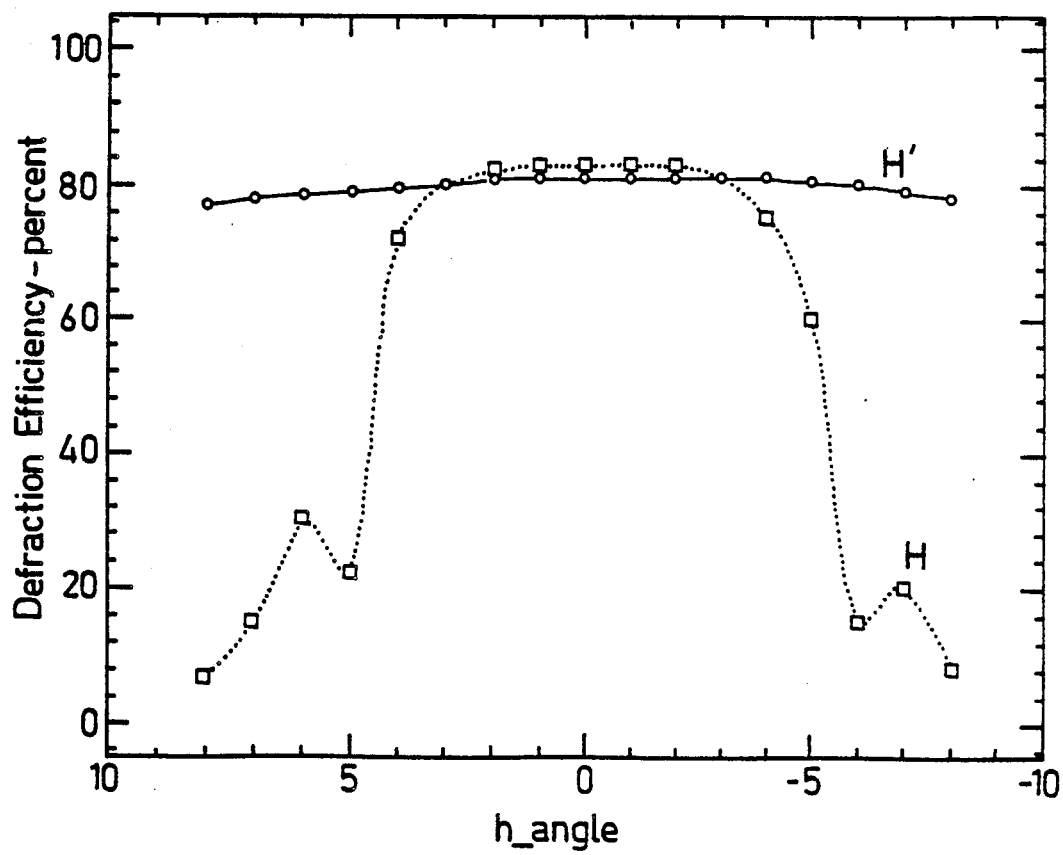
FIG. 16 illustrates the experimental diffraction efficiencies for the holograms H and H'.

FIG. 16 shows the experimental diffraction efficiencies of the holograms H and H' as a function of the horizontal viewing angle (the vertical viewing angle is 0). The hologram was recorded in 15 µm thick Dichromated Gelatin which was prepared from Kodak 649/F plates, and the exposure times were calculated to achieve 0.04 refractive index modulation. As shown, the diffraction efficiency for H decreased to 0 at the edges of the FOV, whereas for H' it remains more than 80% over the entire FOV.

The above description illustrates the manner of making a corrected holographic helmet display lens, with low aberrations and high diffraction efficiency over a relatively wide FOV. Although only one interim hologram was used, resolution 0.8 milliradian and a diffraction efficiency of 80% was obtained over a FOV of ±8°, which is much better than the performance of a non-corrected element. By adding more interim holograms to the recording waves, it is possible to increase even more the performance of the final element, so as to obtain wider FOV and better resolution.

While the invention has been described with respect to one preferred embodiment, it will be appreciated that many other variations, modifications and applications of the invention may be made.

What is claimed is:

1. A method of producing a final hologram for a holographic optical element for use in imaging a multi-dimensional array of points, in which two coherent recording beams are utilized to produce an interference pattern which is recorded to form the final hologram over an entire field of view using reconstruction, object and reference waves according to predetermined recording and readout geometries and parameters, characterized in that at least two intermediate holograms are first produced and used for producing the final hologram; at least one intermediate hologram being produced by selecting the recording and readout parameters to reduce not only astigmatism, but also coma, spherical and field curvature aberrations which arise in holographic elements used for imaging a two-dimensional array of points because of the differences between the recording and readout geometries; and at least one other intermediate hologram being produced satisfying the Bragg condition over the entire final hologram in order to achieve high diffraction efficiency over the entire field of view of the final hologram.

2. The method according to claim 1, wherein the predetermined parameters of the recording and readout geometries of the intermediate holograms for reducing said aberrations are selected according to the following equations:

$$\begin{cases} \sin \beta_c^r + \mu^r [\sin \beta_o^r - \sin \beta_r^r] = -\sin \beta_{eye} \\ \dfrac{1}{R_c^r} + \mu^r \left[ \dfrac{1}{R_o^r} - \dfrac{1}{R_r^r} \right] = 0 \\ \dfrac{1}{(R_c^r)^3} + \mu^r \left[ \dfrac{1}{(R_o^r)^3} - \dfrac{1}{(R_r^r)^3} \right] = \dfrac{1}{R_o R_{eye}} \left[ \dfrac{1}{R_{eye}} - \dfrac{1}{R_o} \right] \\ \dfrac{\sin^2 \beta_c^r}{R_c^r} + \mu^r \left[ \dfrac{\sin^2 \beta_o^r}{R_o^r} - \dfrac{\sin^2 \beta_r^r}{R_r^r} \right] = 0 \\ \dfrac{\sin \beta_c^r}{(R_c^r)^2} + \mu^r \left[ \dfrac{\sin \beta_o^r}{(R_o^r)^2} - \dfrac{\sin \beta_r^r}{(R_r^r)_2} \right] = \dfrac{\sin \beta_o}{R_o R_{eye}} \\ \dfrac{\sin^3 \beta_c^r}{(R_c^r)^2} + \mu^r \left[ \dfrac{\sin^3 \beta_o^r}{(R_o^r)^2} - \dfrac{\sin^3 \beta_r^r}{(R_r^r)^2} \right] = \dfrac{\sin^3 \beta_o}{3 R_o R_{eye}} \end{cases}$$

where: "c", "o" and "r" are the indices of the reconstruction, object and reference waves, respectively; "Rq (q=c,o,r)" is the distance between a respective point source and the center of each intermediate hologram; "$\beta$q (q=c,o,r)" is the angle between the projection of Rq on the horizontal plane and the axis of the hologram; "$\mu$" is the ratio between the wavelengths of the readout and the recording waves; the parameters denoted with superscript "r" are related to the intermediate hologram, and those with no superscript are related to the final hologram; "$R_{eye}$" is the distance from the center of the final hologram to the observer's eye where the final image appears; and "$\beta_{eye}$" is the angle between the axis of the hologram and the observer's eye.

3. The method according to claim 1, wherein the intermediate hologram satisfying the Bragg condition is produced by using a planar reference wave recording beam having a predetermined phase, and an object wave recording beam that is derived from the diffracted negative first order of the intermediate hologram having reduced aberrations.

* * * * *